Dec. 28, 1926.  
H. GEORGE  
1,612,628

PROCESS FOR THE MANUFACTURE OF ARTICLES IN SILICA GLASS

Filed July 15, 1924

INVENTOR:-  
HENRI GEORGE  
by his Attorneys  
Howson and Howson

Patented Dec. 28, 1926.

1,612,628

UNITED STATES PATENT OFFICE.

HENRI GEORGE, OF PARIS, FRANCE, ASSIGNOR TO SOCIÉTÉ ANONYME QUARTZ & SILICE, OF PARIS, FRANCE, A CORPORATION OF FRANCE.

PROCESS FOR THE MANUFACTURE OF ARTICLES IN SILICA GLASS.

Application filed July 15, 1924, Serial No. 726,141, and in France November 2, 1923.

The present invention has for its object a process of manufacture of articles of various shapes in fused pure silica.

In the present state of the technics of silica glass, the operation is carried out in the following manner:

The raw material, for example sand or rock crystal is heaped around a graphite electrode. This electrode being raised by the passage of the current to a high temperature, the sand melts around the electrode and there is obtained finally a tube with thick walls known as the ingot. This ingot is then expanded in a mould. This method of procedure presents the following disadvantages:

(1) It is impossible to obtain articles with thicknesses varying greatly in their different parts.

(2) The ingot being open at its lower end, closed articles (for example balloons) can be obtained only by welding the bottom of the ingot by compression before moulding, which then constitutes a weak point in the article.

(3) The articles are only completely vitrified (glazed) on the interior.

The process forming the subject of the present invention allows of obtaining articles of any shape, glazed either externally or internally, and ingots or articles closed at one end or at both ends.

It consists in melting the raw material in actual contact with the mould of refractory and conducting material, preferably graphite or amorphous carbon, the charge being heaped according to the circumstances within the mould or upon its outer surface. The mould is raised to the temperature, allowing the charge to melt at its contact, by currents of high intensity developed by induction within its mass by a magnetic field of very high frequency.

The accompanying sheet of drawings represents by way of examples different forms in which the invention may be carried out.

Figure 1:
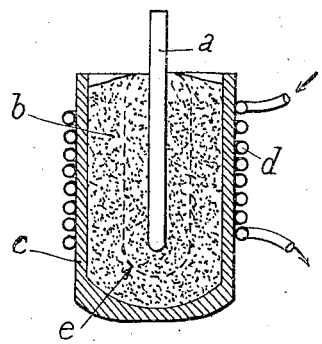
Figure 1 is a view in axial section through a device for the manufacture of an ingot closed at its lower end.

In the arrangement represented in Figure 1, for the manufacture of an ingot closed at its lower end, the mould $a$ is a rod of graphite or amorphous carbon; the charge $b$ is constituted by sand or rock crystal suitably powdered or by any other raw material possessing more than 99.5 per cent of silica; this charge is contained in a vessel $c$ which may be of porcelain, micanite, fused silica or any other insulating material. The mould $a$ is buried in the charge at its lower end.

Around the vessel $c$ there is arranged a helicoidal winding $d$ consisting of a copper or aluminum tube traversed by an alternating current of very high frequency (40,000 periods per second for example), produced by known means (high frequency alternator, electrode or spark generator, or three-electrode lamps). The winding of the tube $d$ upon the insulating wall $c$ is effected in such a way as to produce the maximum field compatible with the tension between the coils and the intensity of the current. The tube may be cooled by water circulation.

In these conditions the mould $a$ is carried very rapidly to an extremely high temperature and the charge melts regularly at its contact. The operation is stopped when the article attains the desired thickness. The ingot obtained is shown in the drawing in dotted lines at $e$. If it is desired then to mould this ingot to another shape, it is only necessary to withdraw the rod $a$ smartly and to expand the ingot in a suitable mould.

In order to obtain by this process a solid body closed at the two ends, it suffices to sink the mould completely in the charge.

Figure 2:
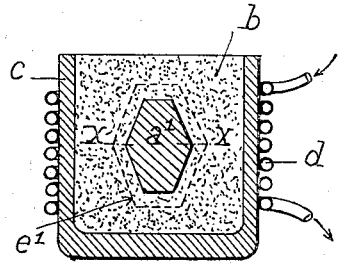
Figure 2 is a corresponding view for the manufacture of crucibles.

Figure 2 thus represent a mould $a^1$ intended for the fabrication of crucibles. The article obtained $e^1$ is shown in dotted lines. This part, cut in two at the plane $x$ $x$, will yield two silica crucibles and free the mould for a further melting.

Figure 3:
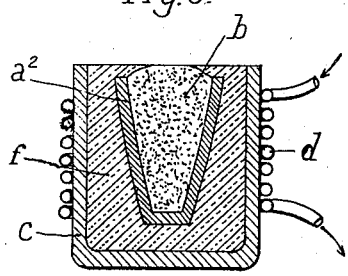
Figure 3 is a corresponding view for the manufacture of an article glazed on the exterior.

In order to obtain an article glazed on the exterior, the mould $a^2$ (Figure 3) will have a tubular shape and the charge $b$ will be heaped in the interior.

Externally of the mould, between the latter and the vessel $c$, there is arranged a suitable heat repeller *f* (wood-charcoal, lamp black, etc.).

Figure 4:
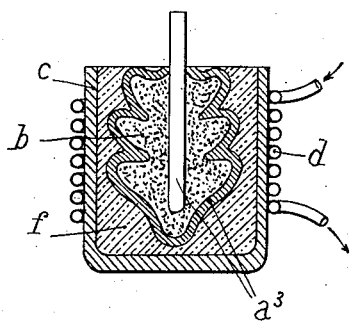
Figure 4 is a corresponding view for the manufacture of an article of more complicated shape.

In order to obtain more complicated articles, it is evident that the mould can be arranged in several parts for facilitating the withdrawal and can comprise cores if desired. Figure 4 represents the mould $a^3$ of a silicia insulator. Moreover, the mould for current operations can be replaced by a simple crucible.

To this crucible can be adapted any suitable devices for allowing the shaping, drawing or moulding of the fused charge.

Figure 5:
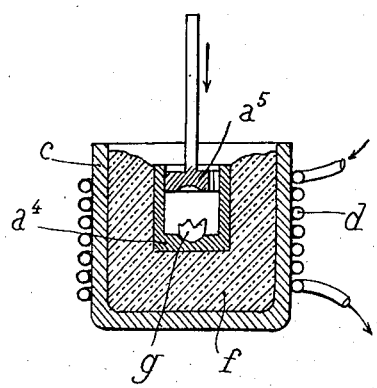
Figure 5 is a corresponding view of a device intended for the shaping of articles of fused silica.

Thus the device of Figure 5 allows of moulding a piece of fused silica to the desired shape.

This device is particularly suited for the softening of articles of transparent silica for optical work, with a view to giving them an almost final shape before cutting.

The mould is in several parts; it comprises one part $a^4$, with a hollow of a shape corresponding to one face of the lens or other article to be obtained, and a piston $a^5$, with a hollow of a shape corresponding to the other face of this article. The article to be softened is placed at $g$. When the temperature is attained, the piston $a^5$ is lowered upon the stationary part $a^4$, and the article $g$ is moulded to the desired shape.

It is particularly convenient in all cases to provide the vessel $b$ with a tight-fitting cover since no current-lead has to pass through it. The invention thus lends itself well to the carrying out of fusions in vacuo when desired, for example for obtaining fused silica without bubbles by starting from rock crystal granules. The operation can also be carried out in the atmosphere which is desired. A slightly oxidizing atmosphere, by lessening the reduction of the silica at high temperature, improves the fused product.

It has been supposed in the foregoing description, that the charge was constituted by silica; it is evident that without in any way changing the invention, the charge might equally be formed by a mixture very rich in silica, in order to obtain for example special glasses having a content of silica exceeding 90 per cent, glasses of which the melting temperatures approach those employed for pure silica and which by their properties are close to this last product.

What I claim is:

1. A process for the manufacture of articles of various shapes in silica glass, consisting in melting the charge in actual contact with a mould, of refractory and conducting material, raised to high temperature by high frequency induction.

2. A process for the manufacture of articles of various shapes in silica glass, consisting in melting a charge of silicious material in actual contact with a mould of refractory and electrically conducting material, entirely embedded within the charge to be melted, and insulated from any source of heat and from any metallic connection, by raising the temperature of said mould, and of the charge, by high frequency induction.

In testimony whereof, I have signed my name to this specification at Paris, France.

HENRI GEORGE.